US009527980B2

(12) United States Patent
Nanba

(10) Patent No.: US 9,527,980 B2
(45) Date of Patent: Dec. 27, 2016

(54) POLYTETRAFLUOROETHYLENE AQUEOUS DISPERSION, AND POLYTETRAFLUOROETHYLENE FINE POWDER

(71) Applicant: DAIKIN INDUSTRIES, LTD., Osaka-shi, Osaka (JP)

(72) Inventor: Yoshinori Nanba, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/648,556

(22) PCT Filed: Dec. 2, 2013

(86) PCT No.: PCT/JP2013/082382
§ 371 (c)(1),
(2) Date: May 29, 2015

(87) PCT Pub. No.: WO2014/084399
PCT Pub. Date: Jun. 5, 2014

(65) Prior Publication Data
US 2015/0322237 A1 Nov. 12, 2015

Related U.S. Application Data

(60) Provisional application No. 61/731,921, filed on Nov. 30, 2012.

(51) Int. Cl.
| | | |
|---|---|---|
| C08K 5/101 | (2006.01) | |
| C08L 27/18 | (2006.01) | |
| C08F 114/26 | (2006.01) | |
| C08F 14/26 | (2006.01) | |
| C08F 2/44 | (2006.01) | |

(52) U.S. Cl.
CPC ............. *C08K 5/101* (2013.01); *C08F 2/44* (2013.01); *C08F 14/26* (2013.01); *C08F 114/26* (2013.01)

(58) Field of Classification Search
CPC ....... C08K 5/101; C08F 114/266; C08L 27/18
USPC ...................................................... 524/156
See application file for complete search history.

(56) References Cited

U.S. PATENT DOCUMENTS

| 2,559,752 | A | 7/1951 | Berry |
| 6,156,839 | A | 12/2000 | Wu et al. |
| 6,297,334 | B1 | 10/2001 | Marchese et al. |
| 6,310,142 | B1 | 10/2001 | Apostolo et al. |
| 6,395,834 | B1 | 5/2002 | Albano et al. |
| 6,395,848 | B1* | 5/2002 | Morgan ............. C08F 14/26 523/203 |
| 6,509,429 | B1 | 1/2003 | Kitaichi et al. |

| 2007/0135558 | A1 | 6/2007 | Tsuda et al. |
| 2008/0200571 | A1 | 8/2008 | Higuchi et al. |
| 2008/0200627 | A1 | 8/2008 | Funaki et al. |
| 2010/0160465 | A1 | 6/2010 | Aten et al. |
| 2010/0160490 | A1 | 6/2010 | Leffew et al. |
| 2010/0204345 | A1 | 8/2010 | Yamanaka et al. |
| 2011/0015342 | A1 | 1/2011 | Kose et al. |
| 2012/0028046 | A1 | 2/2012 | Ono et al. |
| 2014/0031469 | A1* | 1/2014 | Tanimoto ............. C08K 5/09 524/238 |

FOREIGN PATENT DOCUMENTS

| CN | 1875035 A | 12/2006 |
| EP | 1029875 A1 | 8/2000 |
| EP | 1031607 A1 | 8/2000 |
| EP | 1492827 | 1/2005 |
| GB | 2327087 A | 1/1999 |
| JP | 2000-34309 A | 2/2000 |
| JP | 2000-239321 A | 9/2000 |
| JP | 2000-239470 A | 9/2000 |
| JP | 2003-500495 A | 1/2003 |
| JP | 2009-155558 A | 7/2009 |
| JP | 2010-180364 A | 8/2010 |
| JP | 4714991 B2 | 7/2011 |
| JP | 2012-513530 A | 6/2012 |
| JP | 2012-513535 A | 6/2012 |
| JP | 2012-214766 A | 11/2012 |
| WO | 2007/046345 A1 | 4/2007 |
| WO | 2007/046377 A1 | 4/2007 |
| WO | 2008/001894 A1 | 1/2008 |
| WO | 2009/020187 A1 | 2/2009 |

(Continued)

OTHER PUBLICATIONS

International Search Report dated Feb. 18, 2014 in counterpart application No. PCT/JP2013/082386.
International Preliminary Report on Patentability and Written Opinion dated Jun. 2, 2015 from the International Searching Authority in counterpart application No. PCT/JP2013/082386.
International Search Report dated Feb. 25, 2014 in counterpart application No. PCT/JP2013/082351.
International Preliminary Report on Patentability and Written Opinion dated Jun. 2, 2015 from the International Searching Authority in counterpart application No. PCT/JP2013/082382.
International Preliminary Report on Patentability and Written Opinion dated Jun. 2, 2015 in counterpart application No. PCT/JP2013/082351.
International Search Report of PCT/JP2013/082382 dated Jan. 14, 2014.

(Continued)

*Primary Examiner* — Ling Choi
*Assistant Examiner* — Ronald Grinsted
(74) *Attorney, Agent, or Firm* — Sughrue Mion, PLLC

(57) ABSTRACT

The present invention aims to provide a polytetrafluoroethylene aqueous dispersion which contains significantly minute polytetrafluoroethylene particles and which is excellent in dispersion stability, and a significantly minute polytetrafluoroethylene fine powder. The polytetrafluoroethylene aqueous dispersion contains polytetrafluoroethylene particles including a tetrafluoroethylene unit alone or a tetrafluoroethylene unit and a modifying monomer unit derived from a modifying monomer copolymerizable with the tetrafluoroethylene unit. The polytetrafluoroethylene particles have a volume average particle size of not smaller than 0.1 nm but smaller than 20 nm.

5 Claims, No Drawings

(56) References Cited

FOREIGN PATENT DOCUMENTS

| WO | 2009/119202 A1 | 10/2009 |
| WO | 2010/113950 A1 | 10/2010 |
| WO | WO 2012/133655 A1 * | 10/2012 |
| WO | 2013/115278 A1 | 8/2013 |

OTHER PUBLICATIONS

Communication dated Jun. 1, 2016 from the European Patent Office issued in corresponding Application No. 13858148.3.
Communication dated Jun. 10, 2016 from the European Patent Office issued in corresponding Application No. 13859432.0.
Communication dated Jun. 10, 2016 from the European Patent Office issued in corresponding Application No. 13858460.2.

* cited by examiner

POLYTETRAFLUOROETHYLENE AQUEOUS DISPERSION, AND POLYTETRAFLUOROETHYLENE FINE POWDER

CROSS REFERENCE TO RELATED APPLICATIONS

This application is a National Stage of International Application No. PCT/JP2013/082382 filed Dec. 2, 2013, claiming priority based on U.S. Provisional Patent Application No. 61/731,921, filed Nov. 30, 2012, the contents of all of which are incorporated herein by reference in their entirety.

TECHNICAL FIELD

The present invention relates to a method of producing a polytetrafluoroethylene aqueous dispersion and a polytetrafluoroethylene fine powder.

BACKGROUND ART

Fluororesin aqueous dispersions are usually produced by emulsion polymerizing a fluoromonomer in the presence of a fluorosurfactant. Conventional fluorosurfactants are long-chain fluorosurfactants such as perfluorooctanoic acid or its salt.

However, Patent Literature 1 discloses that the persons and parties involved have proposed to control disposal of ammonium perfluorooctanoate, which does not exist in the natural world and is difficult to decompose, in consideration of the environment, and they also have indicated that the substance is highly bioaccumulative.

Thus, Patent Literature 1 discloses a polytetrafluoroethylene aqueous emulsion obtained by emulsion polymerizing tetrafluoroethylene alone or with a monomer copolymerizable therewith in an aqueous medium using a fluorinated emulsifier represented by the formula (1): $XCF_2CF_2(O)_mCF_2CF_2OCF_2COOA$ (wherein X represents a hydrogen atom or a fluorine atom; A represents a hydrogen atom, an alkali metal, or $NH_4$; and m is an integer of 0 or 1) in an amount of 1500 to 20000 ppm based on the final yield of polytetrafluoroethylene.

Patent Literature 2 discloses a low molecular weight polytetrafluoroethylene aqueous dispersion produced by a method of producing a low molecular weight polytetrafluoroethylene, comprising emulsion polymerizing tetrafluoroethylene alone or tetrafluoroethylene and a modifying monomer copolymerizable with the tetrafluoroethylene in an aqueous medium in the presence of a reactive compound and a chain-transfer agent, wherein the reactive compound has a hydrophilic group and a functional group that is reactive in radical polymerization, and the amount of the reactive compound is more than the amount corresponding to 10 ppm based on the amount of the aqueous medium.

Further, Patent Literature 3 discloses aqueous dispersion of fluoropolymer particles produced by a method of producing an aqueous dispersion of fluoropolymer particles, comprising the steps of: preparing dispersed particles of a fluorinated ionomer in an aqueous polymerization medium; and polymerizing at least one fluorinated monomer in the presence of the dispersed particles of the fluorinated ionomer and an initiator in the aqueous polymerization medium to form an aqueous dispersion of fluoropolymer particles.

CITATION LIST

Patent Literature

Patent Literature 1: WO 2007/046345
Patent Literature 2: JP 2010-180364 A
Patent Literature 3: JP 2012-513530 T

SUMMARY OF INVENTION

Technical Problem

In the conventional techniques, emulsion polymerization of a fluoromonomer using a fluorosurfactant which is not a long-chain fluorosurfactant tends to provide fluororesin particles having a large particle size. Further, such particles tend to have poor dispersion stability, resulting in problems such as sticking of the polymer to an agitator during the polymerization. In particular, it is not easy to provide a polytetrafluoroethylene aqueous dispersion having a sufficiently small particle size and excellent dispersion stability. In fact, no polytetrafluoroethylene aqueous dispersion has been known which contains significantly minute polytetrafluoroethylene particles not larger than a specific standard size and which is excellent in dispersion stability. Also, no significantly minute polytetrafluoroethylene fine powder has been known which is not larger than a specific standard size.

The present invention is devised in the aforementioned situation, and aims to provide a method of producing a polytetrafluoroethylene aqueous dispersion which contains significantly minute polytetrafluoroethylene particles and which is excellent in dispersion stability, and a significantly minute polytetrafluoroethylene fine powder.

Solution to Problem

The present inventor has performed various studies, and thus successfully produced a polytetrafluoroethylene aqueous dispersion which contains significantly minute polytetrafluoroethylene particles not larger than a specific standard size and which is excellent in dispersion stability and a very minute polytetrafluoroethylene fine powder not larger than a specific standard size. Finally, the inventor has arrived at the present invention.

Specifically, the present invention relates to an aqueous dispersion comprising polytetrafluoroethylene particles comprising a tetrafluoroethylene unit alone or a tetrafluoroethylene unit and a modifying monomer unit derived from a modifying monomer copolymerizable with the tetrafluoroethylene, the polytetrafluoroethylene particles having a volume average particle size of not smaller than 0.1 nm but smaller than 20 nm.

The polytetrafluoroethylene aqueous dispersion of the present invention preferably further comprises a fluorosurfactant having a Log POW value of not higher than 3.4 in an amount corresponding to 4600 to 500000 ppm of the aqueous dispersion.

The fluorosurfactant is preferably a fluorinated compound represented by the following formula (1):

$$X\text{—}(CF_2)_{m1}\text{—}Y \quad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

The polytetrafluoroethylene aqueous dispersion of the present invention is preferably free from a fluorinated compound represented by the following formula (2):

$$X-(CF_2)_{m2}-Y \quad (2)$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

The present invention also relates to a polytetrafluoroethylene fine powder comprising polytetrafluoroethylene comprising a tetrafluoroethylene unit alone or a tetrafluoroethylene unit and a modifying monomer unit derived from a modifying monomer copolymerizable with the tetrafluoroethylene, the polytetrafluoroethylene having a volume average particle size of not smaller than 0.1 nm but smaller than 20 nm.

Advantageous Effects of Invention

The polytetrafluoroethylene aqueous dispersion of the present invention contains significantly minute polytetrafluoroethylene particles and is excellent in dispersion stability. Thus, the aqueous dispersion is stable against a mechanical shearing force so that the particles are less likely to coagulate, and the aqueous dispersion has good sedimentation stability. Further, the polytetrafluoroethylene fine powder of the present invention has a significantly small particle size. Thus, the powder particles are significantly finely dispersible in a matrix material, so that the powder can further improve the smoothness and the texture of the coating surface.

DESCRIPTION OF EMBODIMENTS

The present invention is described in detail below.

The polytetrafluoroethylene aqueous dispersion of the present invention contains polytetrafluoroethylene (PTFE) particles which include a tetrafluoroethylene (TFE) unit alone or the tetrafluoroethylene unit and a modifying monomer unit based on a modifying monomer copolymerizable with the tetrafluoroethylene.

The PTFE may be a PTFE homopolymer or a modified PTFE. The modified PTFE includes a TFE unit and a modifying monomer unit based on a modifying monomer copolymerizable with TFE. The PTFE may be a non-melt-processible, fibrillatable high molecular weight PTFE or a melt-processible, non-fibrillatable low molecular weight PTFE.

The term "melt-processible" herein means that a polymer can be molten and then processed using a conventional processing device such as an extruder or an injection molding device.

The modifying monomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and nitrile group-containing fluorinated vinyl ethers. These modifying monomers may be used alone or in combination.

Any perfluorovinyl ether may be used, and examples thereof include unsaturated perfluoro compounds represented by the following formula (5):

$$CF_2=CF-ORf^8 \quad (5)$$

wherein $Rf^8$ represents a perfluoro organic group. The term "perfluoro organic group" herein means an organic group in which all the hydrogen atoms coupled with the carbon atoms are replaced by fluorine atoms. The perfluoro organic group may have ether oxygen.

Examples of the perfluorovinyl ethers include perfluoro (alkyl vinyl ethers) (PAVE) represented by the formula (5) wherein $Rf^8$ is a C1-C10 perfluoroalkyl group. The perfluoroalkyl group preferably has 1 to 5 carbon atoms.

The perfluoroalkyl group in the PAVE may be a perfluoromethyl group, a perfluoroethyl group, a perfluoropropyl group, a perfluorobutyl group, a perfluoropentyl group, or a perfluorohexyl group, for example. Preferred is perfluoropropyl vinyl ether (PPVE) in which the perfluoroalkyl group is a perfluoropropyl group.

Examples of the perfluorovinyl ethers further include those represented by the formula (5) wherein $Rf^8$ is a C4-C9 perfluoro(alkoxy alkyl) group; those represented by the formula (5) wherein $Rf^8$ is a group represented by the following formula:

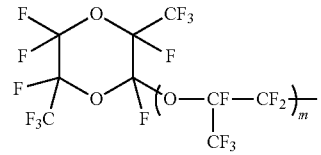

wherein m is 0 or an integer of 1 to 4; and those represented by the formula (5) wherein $Rf^8$ is a group represented by the following formula:

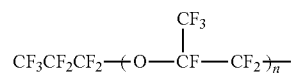

wherein n is an integer of 1 to 4.

Any perfluoroalkylethylenes may be used, and examples thereof include perfluorobutylethylene (PFBE) and perfluorohexylethylene (PFHE).

The nitrile group-containing fluorinated vinyl ether is more preferably a fluorinated vinyl ether represented by the formula $CF_2=CFORf^9CN$ wherein $Rf^9$ represents a C2-C7 alkylene group in which an oxygen atom may optionally be inserted between two carbon atoms.

The modifying monomer in the modified PTFE is preferably at least one selected from the group consisting of HFP, CTFE, VDF, PPVE, PFBE, and ethylene. It is more preferably at least one monomer selected from the group consisting of HFP and CTFE.

The modified PTFE preferably includes 0.001 to 2 mol %, and more preferably 0.001 to 1 mol %, of the modifying monomer unit.

The amounts of the respective monomers constituting the PTFE herein can be calculated by appropriate combination of NMR, FT-IR, elemental analysis, and X-ray fluorescence analysis in accordance with the types of the monomers.

The PTFE particles have a volume average particle size of not smaller than 0.1 nm but smaller than 20 nm. The particles having a volume average particle size within the above range is significantly finely dispersible in a matrix material, exerting the effects of further improving the smoothness and the texture of the coating surface. Applying PTFE particles having a volume average particle size within the above range in multistage polymerization can provide an aqueous dispersion which contains fluororesin particles having a significantly small particle size. The particles having too large a volume average particle size lead to an aqueous dispersion which contains fluororesin particles having a significantly large particle size. Thus, the reaction stability may be poor and unexpected coagulum may be generated during the polymerization. Applying PTFE particles having too large a volume average particle size in multistage polymerization fails to provide an aqueous dispersion which contains fluororesin particles having a significantly small particle size and which is excellent in dispersion stability. PTFE particles having a volume average particle size of smaller than 0.1 nm are not easy to produce. The volume average particle size of the PTFE particles is preferably not smaller than 0.5 nm, and more preferably not smaller than 1.0 nm, whereas the particle size is preferably not greater than 15 nm, more preferably not greater than 10 nm, and still more preferably not greater than 5 nm.

The volume average particle size is determined by dynamic light scattering. In the determination, a PTFE aqueous dispersion with a PTFE solids content of 1.0% by mass is prepared. The value is determined using ELSZ-1000S (Otsuka Electronics Co., Ltd.) at 25° C. with 70 accumulations. The refractive index of the solvent (water) is 1.3328 and the viscosity of the solvent (water) is 0.8878 mPa·s. The volume average particle size is the average particle size of the particles dispersed in the state of primary particles.

The PTFE preferably has a melt viscosity (MV) of not lower than $1.0 \times 10$ Pa·S, more preferably not lower than $1.0 \times 10^2$ Pa·S, and still more preferably not lower than $1.0 \times 10^3$ Pa·S.

The melt viscosity can be determined as follows. Specifically, 2 g of a sample is preliminarily heated for five minutes at a measurement temperature (380° C.), and then the value is measured at the maintained temperature with a load of 0.7 MPa using a flow tester (Shimadzu Corp.) and a 2φ-8 L die in conformity with ASTM D1238.

The PTFE preferably has a melting point of 324° C. to 360° C.

The melting point herein is a temperature corresponding to the local maximum on a heat-of-fusion curve drawn using a differential scanning calorimeter (DSC) at a temperature-increasing rate of 10° C./min.

The PTFE is preferably not a fluorinated ionomer because it is difficult to apply a fluorinated ionomer to the use of the PTFE aqueous dispersion to be mentioned later.

The PTFE preferably has an equivalent weight (EW) of not less than 6,000. The equivalent weight (EW) is a dry weight per equivalent of an ion-exchange group. A high equivalent weight (EW) of the PTFE indicates that the monomers constituting the PTFE hardly include an ionomer. Even though the PTFE hardly includes an ionomer, the particles have a significantly small volume average particle size. The equivalent weight (EW) is more preferably not less than 10,000. The EW may have any upper limit, and it is preferably not more than 50,000,000.

The method of producing an aqueous dispersion of fluoropolymer particles disclosed in Patent Literature 3 essentially includes forming dispersed particles of a fluorinated ionomer in the first stage. Thus, the finally produced fluoropolymer has poor heat resistance, and bubbles may be generated and staining may occur when the resulting fluoropolymer is heated. In the polytetrafluoroethylene aqueous dispersion of the present invention, the equivalent weight (EW) of the PTFE is not less than 6,000. Thus, the PTFE particles, and fine powder and molded articles produced therefrom have excellent heat resistance.

The equivalent weight can be determined as follows.

Hydrochloric acid or nitric acid is added to an aqueous dispersion containing PTFE particles so as to coagulate the PTFE. The coagulated PTFE is washed with pure water until the solution after the washing becomes neutral, and then heat dried in vacuo at 110° C. or lower until the moisture is removed. Then, 0.3 g of the dried PTFE is immersed in 30 mL of a saturated NaCl aqueous solution at 25° C. and left to stand under stirring for 30 minutes. Next, the protons in the saturated NaCl aqueous solution are subjected to neutralization titration using a 0.01 N sodium hydroxide aqueous solution with a phenolphthalein indicator. The neutralization provides a PTFE including a sodium ion as the counterion for the ion-exchange group. This PTFE is rinsed with pure water, and then vacuum-dried and weighed. The equivalent weight EW (g/eq) is then determined by the following formula:

$$EW = (W/M) - 22$$

wherein M (mmol) represents the amount of the sodium hydroxide used for neutralization and W (mg) represents the mass of the PTFE including a sodium ion as the counterion for the ion-exchange group.

The polytetrafluoroethylene aqueous dispersion of the present invention contains the PTFE particles dispersed in an aqueous medium. The aqueous medium may be any liquid containing water. It may be a liquid containing water in combination with, for example, a fluorine-free organic solvent such as an alcohol, an ether, or a ketone and/or a fluorine-containing organic solvent having a boiling point of 40° C. or lower. The aqueous medium is preferably water.

The polytetrafluoroethylene aqueous dispersion of the present invention may contain a fluorosurfactant having a Log POW value of not higher than 3.4 in an amount corresponding to 4600 to 500000 ppm of the aqueous dispersion. Too small an amount of the fluorosurfactant may cause poor dispersion stability, whereas too large an amount thereof may fail to exert its effects that correspond to the amount, which is economically disadvantageous. The amount of the fluorosurfactant is preferably 18,000 ppm or more, more preferably 20,000 ppm or more, still more preferably 23,000 ppm or more, and particularly preferably 38,000 ppm or more, whereas the amount is preferably 400,000 ppm or less, and more preferably 300,000 ppm or less.

Since the polytetrafluoroethylene aqueous dispersion of the present invention contains a fluorosurfactant having a Log POW value of not higher than 3.4, it can have excellent dispersion stability even without a conventionally used long-chain fluorosurfactant.

The Log POW value is a 1-octanol/water partition coefficient which is represented by Log P (wherein P is the ratio between the concentration of the fluorosurfactant in octanol and that in water in a phase-separated octanol/water (1:1) liquid mixture containing the fluorosurfactant). The Log POW value is preferably 1.5 or higher. In order to make it easy to remove the surfactant from PTFE, the value is preferably 3.0 or lower, and more preferably 2.8 or lower.

The Log POW value is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, TOSOH CORP.) as a column and acetonitrile/0.6% by mass HClO$_4$ aqueous solution (=1/1 (vol/vol %)) as an eluent, at a flow rate of 1.0 ml/min, a sample amount of 300 μL, and a column temperature of 40° C.; with a detection light of UV 210 nm. For each standard substance, a calibration curve is drawn with respect to the retention time and the known octanol/water partition coefficient. Based on this calibration curve, the Log POW value is calculated from the elution time of the sample liquid in HPLC.

The fluorosurfactant having a Log POW value of not higher than 3.4 is preferably an anionic fluorosurfactant, and examples thereof include those described in US 2007/0015864, US 2007/0015865, US 2007/0015866, US 2007/0276103, US 2007/0117914, US 2007/142541, US 2008/0015319, U.S. Pat. No. 3,250,808, U.S. Pat. No. 3,271,341, JP 2003-119204 A, WO 2005/042593, WO 2008/060461, WO 2007/046377, WO 2007/119526, WO 2007/046482, and WO 2007/046345.

The fluorosurfactant having a Log POW value of not higher than 3.4 is preferably an anion surfactant.

The anion surfactant is preferably a carboxylic acid surfactant or a sulfonic acid surfactant, for example. Examples of the surfactants include those comprising perfluorocarboxylic acids (I) represented by the following formula (I), ω-H perfluorocarboxylic acids (II) represented by the following formula (II), perfluoropolyether carboxylic acids (III) represented by the following formula (III), perfluoroalkyl alkylene carboxylic acids (IV) represented by the following formula (IV), perfluoroalkoxy fluorocarboxylic acids (V) represented by the following formula (V), perfluoroalkyl sulfonic acids (VI) represented by the following formula (VI), and/or perfluoroalkyl alkylene sulfonic acids (VII) represented by the following formula (VII).

The perfluorocarboxylic acid (I) is represented by the following formula (I):

$$F(CF_2)_{n1}COOM \quad (I)$$

wherein n1 is an integer of 3 to 6; and M represents H, $NH_4$, or an alkali metal element.

In the formula (I), the lower limit of n1 is preferably 4 in order to achieve good stability of the polymerization reaction. M is preferably $NH_4$ because it is less likely to remain during processing of the resulting PTFE aqueous dispersion.

For example, the perfluorocarboxylic acid (I) is preferably $F(CF_2)_6COOM$, $F(CF_2)_5COOM$, or $F(CF_2)_4COOM$, where M is defined as mentioned above.

The ω-H perfluorocarboxylic acid (II) is represented by the following formula (II):

$$H(CF_2)_{n2}COOM \quad (II)$$

wherein n2 is an integer of 4 to 8; and M is defined as mentioned above.

In the formula (II), the upper limit of n2 is preferably 6 in order to achieve good stability in the polymerization reaction. M is preferably $NH_4$ because it is less likely to remain during processing of the resulting PTFE aqueous dispersion.

For example, the ω-H perfluorocarboxylic acid (II) is preferably $H(CF_2)_8COOM$, $H(CF_2)_7COOM$, $H(CF_2)_6COOM$, $H(CF_2)_5COOM$, or $H(CF_2)_4COOM$, where M is defined as mentioned above.

The perfluoropolyether carboxylic acid (III) is represented by the following formula (III):

$$Rf^1\text{-}O\text{—}(CF(CF_3)CF_2O)_{n3}CF(CF_3)COOM \quad (III)$$

wherein $Rf^1$ represents a C1-C5 perfluoroalkyl group; n3 is an integer of 0 to 3; and M is defined as mentioned above.

In the formula (III), $Rf^1$ is preferably a C4 or lower perfluoroalkyl group and n3 is preferably 0 or 1 in order to achieve good stability in the polymerization, and M is preferably $NH_4$ because it is less likely to remain during processing of the resulting PTFE aqueous dispersion.

For example, the perfluoropolyether carboxylic acid (III) is preferably $C_4F_9OCF(CF_3)COOM$, $C_3F_7OCF(CF_3)COOM$, $C_2F_5OCF(CF_3)COOM$, $CF_3OCF(CF_3)COOM$, or $CF_3OCF(CF_3)CF_2OCF(CF_3)COOM$, where M is defined as mentioned above. In order to achieve good stability in the polymerization and good removing efficiency, it is more preferably $CF_3OCF(CF_3)COOM$ or $CF_3OCF(CF_3)CF_2OCF(CF_3)COOM$, where M is defined as mentioned above.

The perfluoroalkyl alkylene carboxylic acid (IV) is represented by the following formula (IV):

$$Rf^2(CH_2)_{n4}Rf^3COOM \quad (IV)$$

wherein $Rf^2$ represents a C1-C5 perfluoroalkyl group; $Rf^3$ represents a C1-C3 linear or branched perfluoroalkylene group; n4 is an integer of 1 to 3; and M is defined as mentioned above.

In the formula (IV), $Rf^2$ is preferably a C2 or higher perfluoroalkyl group or a C4 or lower perfluoroalkyl group. $Rf^3$ is preferably a C1 or C2 perfluoroalkylene group, and more preferably $—(CF_2)—$ or $—CF(CF_3)—$. Further, n4 is preferably 1 or 2, and more preferably 1. M is preferably $NH_4$ because it is less likely to remain during processing of the resulting PTFE aqueous dispersion.

For example, the perfluoroalkyl alkylene carboxylic acid (IV) is preferably $C_4F_9CH_2CF_2COOM$, $C_3F_7CH_2CF_2COOM$, $C_2F_5CH_2CF_2COOM$, $C_4F_9CH_2CF(CF_3)COOM$, $C_3F_7CH_2CF(CF_3)COOM$, $C_2F_5CH_2CF(CF_3)COOM$, $C_4F_9CH_2CH_2CF_2COOM$, $C_3F_7CH_2CH_2CF_2COOM$, or $C_2F_5CH_2CH_2CF_2COOM$, where M is defined as mentioned above.

The perfluoroalkoxy fluorocarboxylic acid (V) is represented by the following formula (V):

$$Rf^4\text{—}O\text{—}CY^1Y^2CF_2\text{—}COOM \quad (V)$$

wherein $Rf^4$ represents a C1-C5 perfluoroalkyl group; $Y^1$ and $Y^2$ may be the same as or different from each other, and represent H or F; and M is defined as mentioned above.

In the formula (V), $Rf^4$ is preferably a C1-C3 perfluoroalkyl group, and more preferably a C3 perfluoroalkyl group in order to achieve good polymerization stability. M is preferably $NH_4$ because it is less likely to remain during processing of the resulting PTFE aqueous dispersion.

For example, the perfluoroalkoxy fluorocarboxylic acid (V) is preferably $C_3F_7OCH_2CF_2COOM$, $C_3F_7OCHFCF_2COOM$, or $C_3F_7OCF_2CF_2COOM$, where M is defined as mentioned above.

The perfluoroalkyl sulfonic acid (VI) is represented by the following formula (VI):

$$F(CF_2)_{n5}SO_3M \quad (VI)$$

wherein n5 is an integer of 3 to 6; and M is defined as mentioned above.

In the formula (VI), n5 is preferably an integer of 4 or 5 in order to achieve good polymerization stability, and M is preferably $NH_4$ because it is less likely to remain during processing of the resulting PTFE aqueous dispersion.

For example, the perfluoroalkyl sulfonic acid (VI) is preferably $F(CF_2)_4SO_3M$ or $F(CF_2)_5SO_3M$, where M is defined as mentioned above.

The perfluoroalkyl alkylene sulfonic acid (VII) is represented by the following formula (VII):

$$Rf^5(CH_2)_{n6}SO_3M \quad (VII)$$

wherein $Rf^5$ represents a 1 to 5 perfluoroalkyl group; n6 is an integer of 1 to 3; and M is defined as mentioned above.

In the formula (VII), $Rf^5$ is preferably a C1-C3 perfluoroalkyl group, and more preferably a C3 perfluoroalkyl group. Further, n6 is preferably 1 or 2, and more preferably 1. M is preferably $NH_4$ because it is less likely to remain during processing of the resulting PTFE aqueous dispersion.

For example, the perfluoroalkyl alkylene sulfonic acid (VII) is preferably $C_3F_7CH_2SO_3M$ wherein M is defined as mentioned above.

The fluorosurfactant having a Log POW value of not higher than 3.4 is preferably at least one selected from the group consisting of:
the fluorinated compounds represented by the following formula (1):

$$X\text{—}(CF_2)_{m1}\text{—}Y \tag{1}$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group;
the ω-H perfluorocarboxylic acids (II) represented by the formula (II);
the perfluoropolyether carboxylic acids (III) represented by the formula (III);
the perfluoroalkyl alkylene carboxylic acids (IV) represented by the formula (IV);
the perfluoroalkoxy fluorocarboxylic acids (V) represented by the formula (V); and
the perfluoroalkyl alkylene sulfonic acid (VII) represented by the formula (VII).

The fluorosurfactant having a Log POW value of not higher than 3.4 is more preferably at least one selected from the group consisting of:
the fluorinated compounds represented by the following formula (1):

$$X\text{—}(CF_2)_{m1}\text{—}Y \tag{1}$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group;
the fluorinated compounds represented by the following formula (3):

$$CF_3OCF(CF_3)CF_2OCF(CF_3)COOX \tag{3}$$

wherein X represents a hydrogen atom, $NH_4$, or an alkali metal atom; and
the fluorinated compounds represented by the following formula (4):

$$CF_3CF_2OCF_2CF_2OCF_2COOX \tag{4}$$

wherein X represents a hydrogen atom, $NH_4$, or an alkali metal atom.

The fluorosurfactant having a Log POW value of not higher than 3.4 is still more preferably a fluorinated compound represented by the following formula (1):

$$X\text{—}(CF_2)_{m1}\text{—}Y \tag{1}$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

The polytetrafluoroethylene aqueous dispersion of the present invention is preferably free from a fluorinated compound represented by the following formula (2):

$$X\text{—}(CF_2)_{m2}\text{—}Y \tag{2}$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group. The polytetrafluoroethylene aqueous dispersion of the present invention is excellent in dispersion stability even without such a conventional long-chain fluorosurfactant.

The PTFE aqueous dispersion of the present invention may have a solids content of 1 to 70% by mass. Still, a low solids content leads to a disadvantage in the productivity, so that the solids content is preferably 5 to 60% by mass.

The lower limit of the solids content in the PTFE aqueous dispersion of the present invention is more preferably 10% by mass, still more preferably 15% by mass, much more preferably 20% by mass, particularly preferably 25% by mass, and most preferably 30% by mass.

The upper limit of the solids content in the PTFE aqueous dispersion of the present invention is more preferably 50% by mass, and still more preferably 40% by mass.

The solids content herein is determined as follows. Specifically, 1 g of the aqueous dispersion is dried in a forced air oven at 380° C. for 60 minutes, and the ratio (in terms of percentage) of the mass of residue after heating to the mass (1 g) of the aqueous dispersion is defined as the solids content.

For the PTFE aqueous dispersion of the present invention at a PTFE solids content of 5.0% by mass, the sediment amount of the PTFE particles is preferably not more than 10.0% by mass, more preferably not more than 7.0% by mass, still more preferably not more than 5.5% by mass, and particularly preferably not more than 3.0% by mass. The lower limit thereof is not particularly limited.

The "sediment amount of the PTFE particles" herein can be measured as follows, for example. First, 30 g of a PTFE aqueous dispersion maintained at 25° C. is put in a container for exclusive use, and then stirred at 5000 rpm for five minutes using a centrifuge (himac CT15D, Hitachi Koki Co., Ltd.) equipped with a rotor (type RT15A7), separating the sediment layer and the PTFE aqueous dispersion layer. The PTFE aqueous dispersion layer is isolated and the solids content is determined. The sediment amount is calculated from the difference between the solids content in the PTFE aqueous dispersion layer and the original solids content in the PTFE aqueous dispersion used. The sediment amount is determined in terms of a proportion (% by mass) in the PTFE contained in the PTFE aqueous dispersion. The lower the proportion is, the better the storage stability is.

For the PTFE aqueous dispersion of the present invention at a PTFE solids content of 5.0% by mass, the mesh-up amount of the PTFE particles is preferably not more than 2.5% by mass, more preferably not more than 2.0% by mass, still more preferably not more than 1.8% by mass, and particularly preferably not more than 1.3% by mass. The lower limit is not particularly limited.

The "mesh-up amount of PTFE particles" herein can be determined as follows, for example. First, 100 g of a PTFE aqueous dispersion maintained at 65° C. is circulated at a discharge flow rate of 10 L/h for two hours using a peristaltic pump (roller pump RP-2000, TOKYO RIKAKIKAI CO, LTD.) equipped with a tube (Tygon tube) having an inner diameter of 4.76 mm and an outer diameter of 7.94 mm. Then, the PTFE aqueous dispersion is filtered through a 200-mesh SUS net. The amount of the substance remaining on the net is measured in terms of a proportion (% by mass)

of the PTFE contained in the PTFE aqueous dispersion. The lower the proportion is, the better the mechanical stability is.

The PTFE aqueous dispersion of the present invention can be produced by, for example, a method in which tetrafluoroethylene alone or tetrafluoroethylene and a modifying monomer copolymerizable with the tetrafluoroethylene is/are emulsion polymerized in an aqueous medium in the presence of a fluorosurfactant having a Log POW value of not higher than 3.4 and a polymerization initiator, wherein the amount of the fluorosurfactant corresponds to 4600 to 500000 ppm of the aqueous medium.

The above method can provide an aqueous dispersion which contains PTFE particles having a very small particle size and which is excellent in dispersion stability by the use of a large amount of a specific fluorosurfactant.

In the above method, the aqueous dispersion containing PTFE particles is produced by emulsion polymerizing the fluoromonomer in an aqueous medium in the presence of a fluorosurfactant having a Log POW value of not higher than 3.4 and a polymerization initiator.

The fluorosurfactant having a Log POW value of not higher than 3.4 may be any of the aforementioned compounds.

The amount of the fluorosurfactant used in the above method preferably corresponds to 4600 to 500000 ppm of the aqueous medium. Too small an amount of the fluorosurfactant fails to give an aqueous dispersion containing PTFE particles having a small volume average particle size. Too large an amount thereof fails to exert its effects that correspond to the amount, which is economically disadvantageous. The amount of the fluorosurfactant is preferably 18,000 ppm or more, more preferably 20,000 ppm or more, still more preferably 23,000 ppm or more, and particularly preferably 38,000 ppm or more, whereas the amount is preferably 400,000 ppm or less, and more preferably 300,000 ppm or less.

The polymerization initiator used in the above method may be any initiator capable of generating radicals within the above range of the polymerization temperature, and any known oil-soluble and/or water-soluble polymerization initiators can be used. Further, the initiator may be combined with a reducing agent to form a redox agent, for example, and then starts the polymerization. The concentration of the polymerization initiator can appropriately be determined in accordance with the types of the monomers, the target molecular weight of a polymer, and the reaction rate.

The polymerization initiator is preferably at least one selected from the group consisting of persulfates and organic peroxides. In order to achieve good dispersion stability of the PTFE particles in the aqueous dispersion, the polymerization initiator may be any of persulfates such as ammonium persulfate and potassium persulfate and water-soluble organic peroxides such as disuccinic acid peroxide and diglutamic acid peroxide.

In order to achieve good dispersion stability of PTFE particles in the aqueous dispersion, the polymerization initiator is preferably used in an amount corresponding to 2 ppm or more of the aqueous medium.

The aqueous medium used in the above method is a reaction medium where the polymerization proceeds, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

The emulsion polymerization in the above method can be performed in the presence of a chain-transfer agent. The chain-transfer agent may be a known one. Examples thereof include saturated hydrocarbons such as methane, ethane, propane, and butane; halogenated hydrocarbons such as chloromethane, dichloromethane, and difluoroethane; alcohols such as methanol and ethanol; and hydrogen. The chain-transfer agent is preferably one which is in the gas state at room temperature and atmospheric pressure, and more preferably ethane or propane.

The amount of the chain-transfer agent is usually 1 to 50,000 ppm, and preferably 1 to 20,000 ppm, based on the sum of the amounts of the fluoromonomers supplied.

The chain-transfer agent may be added to a reactor at one time before the start of the polymerization, may be added in portions during the polymerization, or may continually be added during the polymerization.

The emulsion polymerization is preferably performed at 10° C. to 95° C., and more preferably not lower than 30° C. but not higher than 90° C.

The emulsion polymerization is preferably performed at 0.05 to 3.9 MPaG, and more preferably not lower than 0.1 MPaG but not higher than 3.0 MPaG.

The emulsion polymerization is performed as follows. Specifically, a fluoromonomer is put into a polymerization reactor. The contents of the reactor are stirred and the temperature in the reactor is maintained at a predetermined polymerization temperature. A polymerization initiator is added to the reactor to initiate the polymerization reaction. If necessary, components such as an aqueous medium and additives may be put into the reactor before the start of the polymerization reaction. After the start of the polymerization reaction, the fluoromonomer, the polymerization initiator, and the chain-transfer agent can additionally be added in accordance with the respective purposes.

The emulsion polymerization in the above method is preferably performed in the absence of a fluorinated compound represented by the following formula (2):

$$X\text{—}(CF_2)_{m2}\text{—}Y \qquad (2)$$

wherein X represents H or F; m2 is an integer of 6 or greater; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group. The above method can provide an aqueous dispersion containing PTFE particles having a sufficiently small volume average particle size without such a conventional long-chain fluorosurfactant.

The PTFE aqueous dispersion of the present invention contains PTFE particles having a significantly small particle size. Thus, when it is subjected to multistage polymerization, it can provide an aqueous dispersion which contains fluororesin particles each of which has a core-shell structure whose core portion comprises the PTFE particle and which have a significantly small particle size.

Further, a PTFE aqueous dispersion free of fluorosurfactant and having a high solids content can be produced by a step (I) of bringing the PTFE aqueous dispersion of the present invention into contact with an anion exchange resin in the presence of a nonionic surfactant, and a step (II) of condensing the aqueous dispersion produced in the step (I) such that the solids content in the aqueous dispersion is adjusted to 30 to 70% by mass based on 100% by mass of the aqueous dispersion.

The solids content in the condensed PTFE aqueous dispersion is determined as follows. Specifically, 1 g of the aqueous dispersion is dried in a forced air oven at 380° C.

for 60 minutes, and the ratio (in terms of percentage) of the mass of residue after heating to the mass (1 g) of the aqueous dispersion is defined as the solids content.

The aqueous dispersion can be brought into contact with an anion exchange resin by a conventionally known method. The aqueous dispersion can be condensed by the aforementioned method, for example.

The PTFE aqueous dispersion of the present invention is preferably separated and collected from the anion exchange resin after the step (I).

The nonionic surfactant can be any known fluorine-free nonionic compound. Examples of the nonionic surfactant include: ether-type nonionic surfactants such as polyoxyethylene alkyl phenyl ethers, polyoxyethylene alkyl ethers, and polyoxyethylene alkylene alkyl ethers; polyoxyethylene derivatives such as an ethylene oxide/propylene oxide block copolymer; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-type nonionic surfactants such as polyoxyethylene alkylamines and alkyl alkanolamides. These surfactants are non-fluorinated nonionic surfactants.

The hydrophobic group in the compound constituting the nonionic surfactant can be any of alkyl phenol groups, linear alkyl groups, and branched alkyl groups. It is preferably a compound free of benzene ring, such as a compound having no alkyl phenol group in the structure.

The nonionic surfactant is particularly preferably a polyoxyethylene alkyl ether. The polyoxyethylene alkyl ether is preferably one comprising a polyoxyethylene alkyl ether structure having a C10-C20 alkyl group, and more preferably one comprising a polyoxyethylene alkyl ether structure having a C10-C15 alkyl group. The alkyl group in the polyoxyethylene alkyl ether structure preferably has a branched structure.

Examples of commercially available products of the polyoxyethylene alkyl ethers include Genapol X080 (trade name, Clariant), TERGITOL 9-S-15 (trade name, Clariant), NOIGEN TDS-80 (trade name, DKS Co., Ltd.), and LEOCOL TD-90 (trade name, Lion Corp.).

The present invention also relates to a PTFE fine powder comprising PTFE which includes a TFE unit alone or a TFE unit and a modifying monomer unit based on a modifying monomer copolymerizable with TFE, and the powder having a volume average particle size of not smaller than 0.1 nm but smaller than 20 nm.

The PTFE may be the same PTFE as described for the PTFE aqueous dispersion of the present invention.

The volume average particle size of the PTFE fine powder of the present invention is not smaller than 0.1 nm but smaller than 20 nm. The PTFE fine powder having a volume average particle size within the above range is significantly finely dispersible in a matrix material, so that it exerts an effect of further improving the smoothness and the texture of the coating surface. A PTFE fine powder having a volume average particle size of smaller than 0.1 nm is difficult to produce. The volume average particle size of the PTFE fine powder is preferably not smaller than 0.5 nm, and more preferably not smaller than 1.0 nm, whereas the particle size is preferably not larger than 15 nm, more preferably not larger than 10 nm, and still more preferably not smaller than 5 nm.

The volume average particle size of the PTFE fine powder of the present invention is a value determined by dynamic light scattering. In the determination, a PTFE aqueous dispersion with a PTFE solids content of 1.0% by mass is prepared. The value is determined using ELSZ-1000S (Otsuka Electronics Co., Ltd.) at 25° C. with 70 accumulations. The refractive index of the solvent (water) is 1.3328 and the viscosity of the solvent (water) is 0.8878 mPa·s. The volume average particle size is the average particle size of the particles dispersed in the state of primary particles.

The PTFE fine powder of the present invention preferably has an average particle size (average secondary particle size) of 0.1 to 700 μm. The average particle size of the PTFE fine powder is preferably not smaller than 0.5 μm.

The average particle size is equal to the value at 50% in the cumulative distribution determined using a laser diffraction particle size analyzer (JEOL Ltd.) without a cascade impactor at a pressure of 0.1 MPa and a measurement time of three seconds.

The PTFE fine powder of the present invention can be produced by, for example, coagulating the PTFE aqueous dispersion of the present invention. Common examples of the method of coagulating the PTFE aqueous dispersion include methods of agglomerating the emulsified particles by freezing or mechanical shearing force. In order to reduce the amount of polymer remaining in the aqueous phase after the coagulation, an electrolyte such as nitric acid, sulfuric acid, or ammonium nitrate is preferably added as a coagulant to the aqueous dispersion before the coagulation. If an acid is used as an electrolyte, the aqueous phase and the coagulated particles are preferably neutralized with an alkali such as sodium hydroxide or potassium hydroxide after the coagulation.

Then, in order to remove the fluorosurfactant, the coagulated particles are usually further washed with pure water. In order to increase the removing efficiency, the washing is preferably repeated multiple times.

The coagulation of the particles and the washing of the coagulated particles are followed by drying, thereby providing a PTFE fine powder.

The PTFE aqueous dispersion and the PTFE fine powder of the present invention can suitably be used as, for example, additives for modifying molding material, ink, cosmetics, coating material, grease, parts of office automation devices, and toners; and additives for plating solutions. Examples of the molding material include engineering plastics such as polyoxybenzoyl polyester, polyimide, polyamide, polyamide-imide, polyacetal, polycarbonate, and polyphenylene sulfide.

The PTFE aqueous dispersion and the PTFE fine powder of the present invention can suitably be used as additives for molding material for the purposes of, for example, improving non-stickiness and sliding properties of rollers for copying devices; improving the texture of engineering plastic molded products, such as surface sheets of furniture, dashboard of automobiles, and covers of consumer electrical appliances; and improving the smoothness and abrasion resistance of machine parts that generate mechanical friction, such as light-load bearings, gears, cams, buttons of touch-tone phones, movie projectors, camera parts, and sliding parts. Also, they can suitably be used as processing aids for engineering plastics.

The PTFE aqueous dispersion and the PTFE fine powder of the present invention can be used as additives for coating material for the purpose of improving the smoothness of varnish and paint. The PTFE aqueous dispersion and the PTFE fine powder of the present invention can be used as additives for cosmetics for the purpose of, for example, improving the smoothness of cosmetics such as foundation.

The PTFE aqueous dispersion and the PTFE fine powder of the present invention can also suitably used for improving the oil or water repellency of articles such as wax and for improving the smoothness of grease and toners.

The PTFE aqueous dispersion and the PTFE fine powder of the present invention can also be used as electrode binders for secondary batteries and fuel cells, hardness adjusters for electrode binders, water-repellents for electrode surfaces, and the like. The PTFE aqueous dispersion is more suitable for this use than the PTFE fine powder, in many cases.

EXAMPLES

Next, the present invention is described below referring to, but not limited to, examples.

The values in the examples are determined as follows.
(Volume Average Particle Size)

The volume average particle size is measured by dynamic light scattering. A PTFE aqueous dispersion having a PTFE solids content of 1.0% by mass was prepared. The value was determined using ELSZ-1000S (Otsuka Electronics Co., Ltd.) at 25° C. with 70 accumulations. The refractive index of the solvent (water) was 1.3328 and the viscosity of the solvent (water) was 0.8878 mPa·s.
(Melt Viscosity (MV))

The melt viscosity was determined as follows. Specifically, 2 g of a sample was preliminarily heated for five minutes at a measurement temperature (380° C.), and then the value was measured at the maintained temperature with a load of 0.7 MPa using a flow tester (Shimadzu Corp.) and a 2φ-8 L die in conformity with ASTM D1238.
(Modified Amount)

The modified amount was determined by appropriate combination of NMR, FT-IR, elemental analysis, and X-ray fluorescence analysis in accordance with the types of monomers.
(Melting Point)

The melting point was determined as a temperature corresponding to the local maximum on a heat-of-fusion curve drawn using a differential scanning calorimeter (DSC) at a temperature-increasing rate of 10° C./min.
(Solids Content)

The solids content of the pre-condensation aqueous dispersion obtained by polymerization was a value corresponding to the ratio (in terms of percentage) of the mass of residue after heating (which was prepared by drying 1 g of the aqueous dispersion in a forced air oven at 380° C. for 60 minutes) to the mass (1 g) of the aqueous dispersion.

The solids content of the condensed PTFE aqueous dispersion was a value corresponding to the ratio (in terms of percentage) of the mass of residue after heating (which was prepared by drying 1 g of the aqueous dispersion in a forced air oven at 380° C. for 60 minutes) to the mass (1 g) of the aqueous dispersion.
(Evaluation of Dispersion Stability)
(Storage Stability Test)

First, 30 g of the PTFE aqueous dispersion maintained at 25° C. was put in a container for exclusive use, and then stirred using a centrifuge (himac CT15D, Hitachi Koki Co., Ltd.) equipped with a rotor (type RT15A7) at 5000 rpm for five minutes, separating the sediment layer and the PTFE aqueous dispersion layer. The PTFE aqueous dispersion layer was isolated and the solids content was determined. The sediment amount was calculated from the difference between the solids content in the PTFE aqueous dispersion layer and the original solids content in the PTFE aqueous dispersion used. The sediment amount was measured as a proportion (% by mass) of the PTFE contained in the PTFE aqueous dispersion used. The lower the proportion is, the better the storage stability is.
(Mechanical Stability Test)

First, 100 g of the PTFE aqueous dispersion maintained at 65° C. was circulated at a discharge flow rate of 10 L/h for two hours using a peristaltic pump (roller pump RP-2000, TOKYO RIKAKIKAI CO, LTD.) equipped with a tube (Tygon tube) having an inner diameter of 4.76 mm and an outer diameter of 7.94 mm. Then, the PTFE aqueous dispersion was filtered through a 200-mesh SUS net. The mesh-up amount was measured as a proportion (% by mass) of the PTFE contained in the PTFE aqueous dispersion used. The lower the proportion is, the better the mechanical stability is.

Example 1

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas was added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 20.5% by mass and a volume average particle size of 0.9 nm.

A portion of the PTFE aqueous dispersion was frozen in a freezer. The frozen portion of the PTFE aqueous dispersion was left to stand until the temperature reached 25° C., and thereby a coagulated powder was obtained. The wet coagulated powder was dried at 150° C. for 18 hours. The PTFE powder at this time had a melt viscosity of $3.0 \times 10^3$ Pa·S and a melting point of 327.0° C.

Deionized water was added to the PTFE aqueous dispersion to adjust the solids content to 5.0% by mass, and the storage stability thereof was evaluated. The sediment amount was 0.1% by mass.

APFH, which is the same dispersant as used in the polymerization, was added to the PTFE aqueous dispersion to adjust the amount of the dispersant to 10.0% by mass. Deionized water was further added to the dispersion to adjust the solids content to 5.0% by mass, and the mechanical stability was evaluated. The mesh-up amount was 0.1% by mass.

Then, 100 g of the resulting PTFE aqueous dispersion was uniformly mixed with 2.0 g of a surfactant (NOIGEN TDS-80, DKS Co., Ltd.), and the mixture was passed through a column filled with an anion exchange resin (trade name: AMBERLITE IRA900J, Rohm and Haas). The resulting aqueous dispersion was maintained at 60° C., and the condensed phase provided by phase separation was collected. This condensed phase had a solids content of 63% by mass. Water and a surfactant were further added to the condensed phase to give a solids content of 60% by mass and a surfactant content of 8% by mass, and the pH was adjusted to 9.6 with ammonia water.

Example 2

The polymerization was performed in the same manner as in Example 1 except that the polymerization temperature was not 85° C. as in Example 1 but 70° C.

Example 3

The polymerization was performed in the same manner as in Example 1 except that the amount of the ammonium persulfate (APS) initiator was not 0.11 g as in Example 1 but 0.006 g.

Example 4

The polymerization was performed in the same manner as in Example 1 except that the amount of the ammonium persulfate (APS) initiator was not 0.11 g as in Example 1 but 0.003 g.

Example 5

The polymerization was performed in the same manner as in Example 1 except that the amount of the ammonium persulfate (APS) initiator was not 0.11 g as in Example 1 but 0.028 g.

Example 6

The polymerization was performed in the same manner as in Example 1 except that the amount of the ammonium persulfate (APS) initiator was not 0.11 g as in Example 1 but 0.006 g and the polymerization was continued until about 185 g of the TFE monomer was consumed in the reaction.

Example 7

The polymerization was performed in the same manner as in Example 1 except that the amount of the ammonium persulfate (APS) initiator was not 0.11 g as in Example 1 but 0.006 g, the amount of the ammonium perfluorohexanoate (APFH) dispersant was not 55.0 g but 26.4 g, and the polymerization was continued until about 10 g of the TFE monomer was consumed in the reaction.

Example 8

The polymerization was performed in the same manner as in Example 1 except that the amount of the ammonium persulfate (APS) initiator was not 0.11 g as in Example 1 but 0.006 g, the amount of the ethane gas was not 0.03 g but 0.01 g, the maintained pressure in the reactor was not 0.83 MPaG but 0.20 MPaG, and the polymerization was continued until about 40 g of the TFE monomer was consumed in the reaction.

Example 9

The polymerization was performed in the same manner as in Example 1 except that the amount of the ammonium persulfate (APS) initiator was not 0.11 g as in Example 1 but 0.006 g, 55.0 g of the ammonium perfluorohexanoate (APFH) dispersant was replaced by 22.0 g of an ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant, and the polymerization was continued until about 40 g of the TFE monomer was consumed in the reaction.

Example 10

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Example 9 but 16.5 g.

Example 11

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Example 9 but 11.0 g.

Example 12

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Example 9 but 9.9 g.

Example 13

The polymerization was performed in the same manner as in Example 9 except that 22.0 g of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant as in Example 9 was replaced by 110.0 g of an ammonium perfluoropentanoate dispersant (APFP), and the polymerization was continued until about 140 g of the TFE monomer was consumed in the reaction.

Example 14

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas and 1.12 g of perfluoro[3-(1-methyl-2-vinyloxy-ethoxy)propionitrile] (hereinafter, abbreviated as CNVE) were added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 19.9% by mass and a volume average particle size of 1.3 nm.

The PTFE aqueous dispersion was frozen in a freezer. The frozen PTFE aqueous dispersion was left to stand until the temperature reached 25° C., and thereby a coagulated powder was obtained. The wet coagulated powder was vacuum dried at 70° C. for 50 hours. The PTFE powder at this time was hardly in flux even under heating, so that the melt viscosity thereof was impossible to measure. The melting point thereof was 327.0° C. and the CNVE modifying amount thereof was 0.20 mol %.

Example 15

The polymerization was performed in the same manner as in Example 14 except that 0.03 g of the ethane gas as in Example 14 was not added.

Example 16

The polymerization was performed in the same manner as in Example 14 except that the polymerization temperature was not 85° C. as in Example 14 but 70° C.

Example 17

The polymerization was performed in the same manner as in Example 14 except that the amount of the ammonium persulfate (APS) initiator was not 0.11 g as in Example 14 but 0.006 g and 1.12 g of the CNVE was replaced by 0.20 g of 3,3,4,4,5,5,6,6,7,7,8,8-tridecafluorooct-1-ene (PFHE).

Example 18

The polymerization was performed in the same manner as in Example 14 except that the amount of the ammonium persulfate (APS) initiator was not 0.11 g as in Example 14 but 0.006 g, 1.12 g of the CNVE was replaced by 0.20 g of HFP, and 0.03 g of the ethane gas was not added.

Example 19

The polymerization was performed in the same manner as in Example 14 except that the amount of the ammonium persulfate (APS) initiator was not 0.11 g as in Example 14 but 0.006 g, 1.12 g of the CNVE was replaced by 0.12 g of PMVE, 0.03 g of the ethane gas was not added, and the polymerization was continued until about 40 g of the TFE monomer was consumed in the reaction.

Example 20

The polymerization was performed in the same manner as in Example 19 except that 0.12 g of the PMVE as in Example 19 was replaced by 0.46 g of PPVE.

Example 21

The polymerization was performed in the same manner as in Example 19 except that 0.12 g of the PMVE as in Example 19 was replaced by 0.18 g of CTFE.

Example 22

The polymerization was performed in the same manner as in Example 19 except that the amount of the PMVE was not 0.12 g as in Example 19 but 0.01 g and the maintained pressure in the reactor was not 0.83 MPaG but 0.20 MPaG.

Example 23

The polymerization was performed in the same manner as in Example 16 except that 55.0 g of the ammonium perfluorohexanoate (APFH) dispersant as in Example 16 was replaced by 27.5 g of an ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant.

Comparative Example 1

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant was not 22.0 g as in Example 9 but 8.3 g.

The resulting PTFE aqueous dispersion had a solids content of 7.1% by mass and a volume average particle size of 121.6 nm.

The dispersion stability of the resulting PTFE aqueous dispersion was evaluated, resulting in poor mechanical stability and poor storage stability. Thus, the dispersion stability was insufficient.

Tables 1 and 2 show the polymerization conditions and the evaluation results on the PTFE aqueous dispersions in the respective examples.

TABLE 1

| | Temperature ° C. | Pressure MPaG | Initiator Type | Initiator Amount g | Emulsifying agent Type | Emulsifying agent Amount g | Modifying agent Type | Modifying agent Amount g | Chain-transfer agent Type | Chain-transfer agent Amount g |
|---|---|---|---|---|---|---|---|---|---|---|
| Example 1 | 85 | 0.83 | APS | 0.110 | APFH | 55.0 | — | — | Ethane | 0.03 |
| Example 2 | 70 | 0.83 | APS | 0.110 | APFH | 55.0 | — | — | Ethane | 0.03 |
| Example 3 | 85 | 0.83 | APS | 0.006 | APFH | 55.0 | — | — | Ethane | 0.03 |
| Example 4 | 85 | 0.83 | APS | 0.003 | APFH | 55.0 | — | — | Ethane | 0.03 |
| Example 5 | 85 | 0.83 | APS | 0.028 | APFH | 55.0 | — | — | Ethane | 0.03 |

TABLE 1-continued

| | Temperature °C. | Pressure MPaG | Initiator Type | Initiator Amount g | Emulsifying agent Type | Emulsifying agent Amount g | Modifying agent Type | Modifying agent Amount g | Chain-transfer agent Type | Chain-transfer agent Amount g |
|---|---|---|---|---|---|---|---|---|---|---|
| Example 6 | 85 | 0.83 | APS | 0.006 | APFH | 55.0 | — | — | Ethane | 0.03 |
| Example 7 | 85 | 0.83 | APS | 0.006 | APFH | 26.4 | — | — | Ethane | 0.03 |
| Example 8 | 85 | 0.20 | APS | 0.006 | APFH | 55.0 | — | — | Ethane | 0.01 |
| Example 9 | 85 | 0.83 | APS | 0.006 | PMPA | 22.0 | — | — | Ethane | 0.03 |
| Example 10 | 85 | 0.83 | APS | 0.006 | PMPA | 16.5 | — | — | Ethane | 0.03 |
| Example 11 | 85 | 0.83 | APS | 0.006 | PMPA | 11.0 | — | — | Ethane | 0.03 |
| Example 12 | 85 | 0.83 | APS | 0.006 | PMPA | 9.9 | — | — | Ethane | 0.03 |
| Example 13 | 85 | 0.83 | APS | 0.006 | APFP | 110.0 | — | — | Ethane | 0.03 |
| Example 14 | 85 | 0.83 | APS | 0.110 | APFH | 55.0 | CNVE | 1.12 | Ethane | 0.03 |
| Example 15 | 85 | 0.83 | APS | 0.110 | APFH | 55.0 | CNVE | 1.12 | — | — |
| Example 16 | 70 | 0.83 | APS | 0.110 | APFH | 55.0 | CNVE | 1.12 | Ethane | 0.03 |
| Example 17 | 85 | 0.83 | APS | 0.006 | APFH | 55.0 | PFHE | 0.20 | Ethane | 0.03 |
| Example 18 | 85 | 0.83 | APS | 0.006 | APFH | 55.0 | HFP | 0.20 | — | — |
| Example 19 | 85 | 0.83 | APS | 0.006 | APFH | 55.0 | PMVE | 0.12 | — | — |
| Example 20 | 85 | 0.83 | APS | 0.006 | APFH | 55.0 | PPVE | 0.46 | — | — |
| Example 21 | 85 | 0.83 | APS | 0.006 | APFH | 55.0 | CTFE | 0.18 | — | — |
| Example 22 | 85 | 0.20 | APS | 0.006 | APFH | 55.0 | PMVE | 0.01 | — | — |
| Example 23 | 70 | 0.83 | APS | 0.110 | PMPA | 27.5 | CNVE | 1.12 | Ethane | 0.03 |
| Comparative Example 1 | 85 | 0.83 | APS | 0.006 | PMPA | 8.3 | — | — | Ethane | 0.03 |

TABLE 2

| | Volume average particle size nm | MV (×10³) Pa·S | Modified Type | Modified Amount Mol % | Melting point °C. | Solids content Mass % | Dispersion stability* Storage stability (Sediment amount) Mass % | Dispersion stability* Mechanical stability (Mesh-up amount) Mass % |
|---|---|---|---|---|---|---|---|---|
| Example 1 | 0.9 | 3.0 | — | — | 327.0 | 20.5 | 0.1 | 0.1 |
| Example 2 | 2.3 | 8.0 | — | — | 328.4 | 21.1 | 0.1 | 0.2 |
| Example 3 | 5.3 | Unmeasurable | — | — | 331.1 | 21.4 | 1.2 | 0.5 |
| Example 4 | 4.2 | Unmeasurable | — | — | 331.2 | 17.0 | 2.3 | 0.8 |
| Example 5 | 1.2 | 15.8 | — | — | 329.3 | 21.4 | 0.2 | 0.2 |
| Example 6 | 5.7 | Unmeasurable | — | — | 330.8 | 25.0 | 2.4 | 0.8 |
| Example 7 | 4.8 | Unmeasurable | — | — | 328.8 | 1.5 | 0.1 | 0.1 |
| Example 8 | 2.3 | Unmeasurable | — | — | 329.3 | 6.5 | 0.2 | 0.2 |
| Example 9 | 4.7 | Unmeasurable | — | — | 328.5 | 7.5 | 0.2 | 0.7 |
| Example 10 | 6.5 | Unmeasurable | — | — | 329.0 | 7.1 | 2.1 | 1.0 |
| Example 11 | 12.1 | Unmeasurable | — | — | 328.2 | 7.1 | 5.1 | 1.7 |
| Example 12 | 19.5 | Unmeasurable | — | — | 328.8 | 7.1 | 7.8 | 2.2 |
| Example 13 | 3.1 | Unmeasurable | — | — | 331.1 | 19.7 | 0.3 | 0.5 |
| Example 14 | 1.3 | Unmeasurable | CNVE | 0.20 | 327.0 | 19.9 | 0.1 | 0.1 |
| Example 15 | 11.8 | Unmeasurable | CNVE | 0.18 | 329.4 | 20.9 | 0.2 | 0.3 |
| Example 16 | 1.6 | Unmeasurable | CNVE | 0.24 | 331.4 | 19.8 | 0.1 | 0.2 |
| Example 17 | 1.9 | Unmeasurable | PFHE | 0.07 | 329.0 | 19.5 | 0.1 | 0.2 |
| Example 18 | 7.6 | Unmeasurable | HFP | 0.10 | 334.9 | 20.3 | 2.7 | 1.2 |
| Example 19 | 1.4 | Unmeasurable | PMVE | 0.20 | 334.7 | 6.6 | 0.1 | 0.2 |
| Example 20 | 1.2 | Unmeasurable | PPVE | 0.26 | 326.1 | 6.6 | 0.1 | 0.2 |
| Example 21 | 7.1 | Unmeasurable | CTFE | 0.27 | 332.8 | 6.6 | 2.5 | 1.1 |
| Example 22 | 3.5 | Unmeasurable | PMVE | 0.02 | 331.6 | 6.4 | 0.3 | 0.5 |
| Example 23 | 0.8 | Unmeasurable | CNVE | 0.60 | 329.6 | 21.2 | 0.1 | 0.2 |
| Comparative Example 1 | 121.6 | Unmeasurable | — | — | 327.6 | 7.1 | 22.9 | 5.3 |

*In Example 7, performed at solids content 1.0 mass %

INDUSTRIAL APPLICABILITY

The polytetrafluoroethylene aqueous dispersion of the present invention contains significantly minute polytetrafluoroethylene particles and is excellent in dispersion stability. Further, the polytetrafluoroethylene fine powder of the present invention has a significantly small particle size. The PTFE aqueous dispersion and the PTFE fine powder of the present invention can suitably be used as additives for a variety of molding material, coating material, cosmetics, wax, grease, and toners; electrode binders for secondary batteries and fuel cells; hardness adjustors for electrode binders; water-repellents; and the like.

The invention claimed is:

1. A polytetrafluoroethylene aqueous dispersion comprising
   polytetrafluoroethylene particles consisting of a tetrafluoroethylene unit or comprising a tetrafluoroethylene unit and 0.001 to 2 mol % of a modifying monomer unit derived from a modifying monomer copolymerizable with the tetrafluoroethylene, the polytetrafluoroethylene particles having a volume average particle size of not smaller than 0.1 nm but smaller than 20 nm and an equivalent weight of not less than 6,000.

2. The polytetrafluoroethylene aqueous dispersion according to claim 1, further comprising a fluorosurfactant having a Log POW value of not higher than 3.4 in an amount corresponding to 4600 to 500000 ppm of the aqueous dispersion.

3. The polytetrafluoroethylene aqueous dispersion according to claim 2, wherein the fluorosurfactant is a fluorinated compound represented by the following formula (1):

$$X-(CF_2)_{m1}-Y \tag{1}$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

4. The polytetrafluoroethylene aqueous dispersion according to claim 1, which is free of fluorinated compound represented by the following formula (2):

$$X-(CF_2)_{m2}-Y \tag{2}$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

5. A polytetrafluoroethylene fine powder comprising polytetrafluoroethylene consisting of a tetrafluoroethylene unit or comprising a tetrafluoroethylene unit and 0.001 to 2 mol % of a modifying monomer unit derived from a modifying monomer copolymerizable with the tetrafluoroethylene, the powder having a volume average particle size of not smaller than 0.1 nm but smaller than 20 nm.

* * * * *